United States Patent
Kim (10) Patent No.: US 12,312,025 B2
(45) Date of Patent: May 27, 2025

(54) APPARATUS AND METHOD FOR CONTROLLING MOTOR DRIVEN POWER STEERING SYSTEM OF VEHICLE BY RAISING RESPONSIVENESS

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 400 days.

(21) Appl. No.: 17/817,325

(22) Filed: Aug. 3, 2022

(65) Prior Publication Data
US 2023/0040500 A1    Feb. 9, 2023

(30) Foreign Application Priority Data
Aug. 9, 2021   (KR) ........................ 10-2021-0104399

(51) Int. Cl.
*B60W 10/20* (2006.01)
*B60W 40/105* (2012.01)
(Continued)

(52) U.S. Cl.
CPC ......... *B62D 5/0463* (2013.01); *B62D 15/024* (2013.01); *B62D 15/025* (2013.01)

(58) Field of Classification Search
CPC ... B06D 5/0463; B62D 15/024; B62D 15/025
See application file for complete search history.

(56) References Cited

U.S. PATENT DOCUMENTS

2016/0001810 A1* 1/2016 Tsubaki ................. B62D 6/08
                                                         701/42
2016/0149523 A1* 5/2016 Yoshiura ................ H02P 23/18
                                                         318/432
(Continued)

FOREIGN PATENT DOCUMENTS

KR    10-2019-0098783    8/2019

OTHER PUBLICATIONS

English Language Abstract of KR 10-2019-0098783 published Aug. 23, 2019.

*Primary Examiner* — Jess Whittington
*Assistant Examiner* — Rami Nabih Bedewi
(74) *Attorney, Agent, or Firm* — DLA PIPER LLP US (57) ABSTRACT

An apparatus may include a command steering angle control portion removing noise of a first command steering angle and outputting a second command steering angle, a steering angle position control portion compensating for a first steering angle error corresponding to a difference between the second command steering angle and a first current steering angle, and outputting a first command current, a first responsiveness improving portion compensating for a second steering angle error corresponding to a difference between the second command steering angle and a second current steering angle, calculating a first compensation value, and applying the first compensation value to the steering angle position control portion, and a second responsiveness improving portion deriving a compensation gain, calculating a second compensation value on the basis of the first steering angle error and the compensation gain, and applying the second compensation value to the steering angle position control portion.

19 Claims, 4 Drawing Sheets

(51) Int. Cl.
    *B62D 5/04*        (2006.01)
    *B62D 15/02*       (2006.01)

(56)            References Cited

U.S. PATENT DOCUMENTS

| | | | |
|---|---|---|---|
| 2017/0120948 A1* | 5/2017  | Kitazume   | B62D 6/002 |
| 2017/0349208 A1* | 12/2017 | Sugawara   | B62D 5/0463 |
| 2018/0201317 A1* | 7/2018  | Kudo       | B60W 10/20 |
| 2024/0116567 A1* | 4/2024  | Kitazume   | B62D 6/08 |
| 2024/0286672 A1* | 8/2024  | Ljung Edin | B62D 5/0463 |

* cited by examiner

APPARATUS AND METHOD FOR CONTROLLING MOTOR DRIVEN POWER STEERING SYSTEM OF VEHICLE BY RAISING RESPONSIVENESS

CROSS-REFERENCE TO RELATED APPLICATION

This application claims priority from and the benefit of Korean Patent Application No. 10-2021-0104399, filed on Aug. 9, 2021, which is hereby incorporated by reference for all purposes as if set forth herein.

BACKGROUND

Field

Exemplary embodiments of the present disclosure relate to an apparatus and a method for controlling a motor driven power steering (MDPS) system of a vehicle, and more particularly, to an apparatus and a method for controlling an MDPS system of a vehicle, which can raise the responsiveness while a position controller basically uses a steering angle of a steering angle sensor during autonomous driving, and is robust to noise of a command steering angle, and stably maximize performance.

Discussion of the Background

In general, a hydraulic power steering apparatus using hydraulic pressure of a hydraulic pump had been used as a power assisted steering apparatus of a vehicle. After the 1990s, however, an MDPS system using an electric motor has been universally used.

In the existing hydraulic power steering apparatus, the hydraulic pump serving as a power source to assist power is driven by an engine, and always consumes energy regardless of whether a steering wheel is turned. In the MDPS system, however, a motor driven by electric energy provides steering assist power when a steering wheel is turned to generate torque.

Therefore, when the MDPS system (or motor driven steering apparatus) is used, the energy efficiency of the vehicle can be improved further than when the hydraulic power steering apparatus is used.

Meanwhile, during autonomous driving, the MDPS is one of the important parts that determines the direction of the vehicle. When a command steering angle is applied from an autonomous driving controller, it is very important to make a control to be robust to vibration or noise while raising responsiveness of the applied command steering angle in the MDPS. Accordingly, in order to improve the performance of a position controller in the MDPS, a conventional PID controller is not used, but various methods are used.

However, since a conventional MDPS position controller for autonomous driving is implemented only as a basic PID controller, the MDPS position controller has a limit in raising the responsiveness, the control performance thereof is greatly reduced when external road noise or vibration is applied thereto, and even the MDPS position controller may diverge. In addition, in the case of a general PID control, it is difficult to effectively deal with friction or inertia that occurs depending on the load of the vehicle. For example, in case that the steering direction is inverted (that is the steering direction is inverted from a left turn to a right turn or from a right turn to a left turn) when controlling left and right positions at a slow speed in a stop condition of the vehicle, the general PID controller may be a problem that the command steering angle cannot be properly followed.

The related art of the present disclosure is disclosed in Korean Patent Application Publication No. 10-2019-0098783 published on Aug. 23, 2019 and entitled "Apparatus for Controlling Handle of Vehicles".

SUMMARY

Various embodiments of the present disclosure are directed to an apparatus and a method for controlling a motor driven power steering (MDPS) system of a vehicle, which raise responsiveness while a position controller basically uses a steering angle of a steering angle sensor during autonomous driving in MDPS, is robust to noise of a command steering angle, and stably maximize performance.

In addition, various embodiments of the present disclosure are directed to an apparatus and a method for controlling a motor driven power steering (MDPS) system of a vehicle, which effectively deals with friction or inertia that occurs depending on the load of the vehicle when a position controller is inverted during autonomous driving in MDPS.

The problems of the present disclosure are not limited to the aforementioned problems, and other problems, which are not mentioned above, may be clearly understood by those skilled in the art to which the present disclosure pertains from the following descriptions.

In an embodiment, an apparatus for controlling a motor driven power steering (MDPS) system of a vehicle may include: a command steering angle control portion configured to remove noise of a first command steering angle inputted from an autonomous driving system, and output a second command steering angle; a steering angle position control portion configured to compensate for a first steering angle error corresponding to a difference between the second command steering angle and a first current steering angle provided from a steering angle sensor, and output a first command current; a first responsiveness improving portion configured to compensate for a second steering angle error corresponding to a difference between the second command steering angle and a second current steering angle provided from a motor, calculate a first compensation value, and apply the first compensation value to the steering angle position control portion; and a second responsiveness improving portion configured to derive a compensation gain according to inversion of a steering angle speed or a motor angle speed, calculate a second compensation value on the basis of the first steering angle error and the compensation gain, and apply the second compensation value to the steering angle position control portion, wherein the steering angle position control portion applies the first compensation value, which is applied from the first responsiveness improving portion, and the second compensation value, which is applied from the second responsiveness improving portion, to the first command current, and outputs a second command current.

The command steering angle control portion may include a first variable low pass filter (LPF) configured to adjust a cut-off frequency thereof according to a vehicle speed, and remove the noise of the first command steering angle.

The steering angle position control portion may include: a second variable LPF configured to low-pass filter the first current steering angle; a position controller configured to compensate for a first steering angle error corresponding to a difference between the second command steering angle and the low-pass filtered first current steering angle; a speed controller configured to compensate for a speed error cor- responding to a difference between a command speed outputted from the position controller and a current steering angle speed, and output the first command current; and a first operation unit configured to add the first compensation value and the second compensation value to the first command current, and output the second command current.

The second variable LPF may adjust a cut-off frequency thereof according to a vehicle speed.

At least one of the position controller and the speed controller may vary a gain on the basis of at least one of the vehicle speed, the motor angle speed and the steering angle speed.

The first responsiveness improving portion may include: a third variable LPF configured to low-pass filter the second current steering angle; a fourth variable LPF configured to low-pass filter the second steering angle error corresponding to a difference between the second command steering angle and the second current steering angle that is low-pass filtered by the third variable LPF; a differentiator configured to differentiate a value obtained by low-pass filtering the second steering angle error by the fourth variable LPF; and a second operation unit configured to multiply a differentiation result value by a gain, and apply a multiplication result value to the steering angle position control portion as the first compensation value.

The third variable LPF may adjust a cut-off frequency thereof according to a vehicle speed.

The fourth variable LPF may adjust a cut-off frequency thereof on the basis of at least one of the motor angle speed and the steering angle speed.

The second responsiveness improving portion may include: a variable high-pass filter (HPF) configured to adjust a cut-off frequency thereof, and high-pass filter the first steering angle error; a third operation unit configured to multiply a value, which is obtained by high-pass filtering the first steering angle error by the variable HPF, by a gain and output a multiplication result value; a compensation gain deriving unit configured to derive the compensation gain according to the inversion of the steering angle speed or the motor angle speed; and a fourth operation unit configured to perform an operation on the compensation gain and a value outputted from the third operation unit, calculate the second compensation value, and apply the second compensation value to the steering angle position control portion.

The compensation gain deriving unit may include: an inversion determination unit configured to detect a code of the steering angle speed or the motor angle speed, and determine whether a steering direction is inverted on the basis of the code; and a compensation gain adjustment unit configured to adjust an amount and a period of a gain to be compensated during inversion through a value of angle acceleration obtained by differentiating the steering angle speed or the motor angle speed.

The inversion determination unit may include: a phase compensation unit configured to compensate for a phase of the current steering angle speed or the motor angle speed; and an inversion steering determination unit configured to detect the code of the steering angle speed or the motor angle speed whose phase is compensated, and determine whether the code of the steering angle speed or the motor angle speed is inverted on the basis of the code.

The compensation gain adjustment unit may include: a differentiator configured to differentiate the steering angle speed or the motor angle speed, and output the angle acceleration; an LPF configured to low-pass filter the angle acceleration outputted from the differentiator; and a final compensation gain adjustment unit configured to adjust the amount and period of the compensation gain on the basis of the low-pass filtered angle acceleration when a determination result of the inversion determination unit indicates inversion.

The final compensation gain adjustment unit may obtain the amount and period of the compensation gain based on the low-pass filtered angle acceleration from a compensation gain table in which information on the amount and period of the compensation gain based on the angle acceleration is stored, and limit the obtained compensation gain within a predetermined range.

The apparatus may further include a current controller configured to compensate for a current error between the second command current outputted from the steering angle position control portion and a sensor current, and output a final command current.

In an embodiment, a method for controlling a motor driven power steering (MDPS) system of a vehicle may include: removing, by a command steering angle control portion, noise of a first command steering angle inputted from an autonomous driving system, and outputting a second command steering angle; compensating, by a steering angle position control portion, for a first steering angle error corresponding to a difference between the second command steering angle and a first current steering angle provided from a steering angle sensor, and outputting a first command current; compensating, by a first responsiveness improving portion, for a second steering angle error corresponding to a difference between the second command steering angle and a second current steering angle provided from a motor, calculating a first compensation value, and applying the first compensation value to the steering angle position control portion; deriving, by a second responsiveness improving portion, a compensation gain according to inversion of a steering angle speed or a motor angle speed, calculating a second compensation value on the basis of the first steering angle error and the compensation gain, and applying the second compensation value to the steering angle position control portion; and applying, by the steering angle position control portion, the first compensation value and the second compensation value to the first command current, and outputting a second command current.

In the outputting of the second command steering angle, the command steering angle control portion may remove the noise of the first command steering angle by adjusting a cut-off frequency according to a vehicle speed and low-pass filtering the first command steering angle, and output the second command steering angle from which the noise is removed.

The outputting of the first command current may include: low-pass filtering, by a second variable LPF, the first current steering angle; compensating, by a position controller, for a first steering angle error corresponding to a difference between the second command steering angle and the low-pass filtered first current steering angle; and compensating, by a speed controller, for a speed error corresponding to a difference between a command speed outputted from the position controller and a current steering angle speed, and outputting the first command current.

The applying of the first compensation value to the steering angle position control portion may include: low-pass filtering, by a third variable LPF, the second current steering angle; low-pass filtering, by a fourth variable LPF, the second steering angle error corresponding to the difference between the second command steering angle and the second current steering angle that is low-pass filtered by the third variable LPF; differentiating, by a differentiator, a value obtained by low-pass filtering the second steering angle error by the fourth variable LPF; and multiplying, by a second operation unit, a differentiation result value by a gain, and applying a multiplication result value to the steering angle position control portion as the first compensation value.

The applying of the second compensation value to the steering angle position control portion may include: adjusting, by a variable high-pass filter (HPF), a cut-off frequency, and high-pass filtering the first steering angle error; multiplying, by a third operation unit, a value, which is obtained by high-pass filtering the first steering angle error, by a gain and outputting a multiplication result value; deriving, by a compensation gain deriving unit, the compensation gain according to the inversion of the steering angle speed or the motor angle speed; and performing, by a fourth operation unit, an operation on the compensation gain and a value outputted from the third operation unit, calculating the second compensation value, and applying the second compensation value to the steering angle position control portion.

The deriving of the compensation gain may include: detecting, by an inversion determination unit, a code of the steering angle speed or the motor angle speed, and determining whether the code of the steering angle speed or the motor angle speed is inverted on the basis of the code; and adjusting, by a compensation gain adjustment unit, an amount and a period of a gain to be compensated during inversion through a value of angle acceleration obtained by differentiating the steering angle speed or the motor angle speed.

The adjusting of the amount and period of the gain to be compensated during the inversion may include: differentiating, by a differentiator, the steering angle speed or the motor angle speed, and outputting angle acceleration; low-pass filtering, by an LPF, the angle acceleration outputted from the differentiator; and adjusting, by a final compensation gain adjustment unit, the amount and period of the compensation gain on the basis of the low-pass filtered angle acceleration when a determination result of the inversion determination unit indicates inversion.

In the adjusting of the amount and period of the compensation gain, the final compensation gain adjustment unit may obtain the amount and period of the compensation gain based on the low-pass filtered angle acceleration from a compensation gain table in which information on the amount and period of the compensation gain based on the angle acceleration is stored, and limit the obtained compensation gain within a predetermined range.

The method may further include compensating, by a current controller, for a current error between the second command current outputted from the steering angle position control portion and a sensor current, outputting a final command current, and applying the outputted final command current to an MDPS, after the outputting of the second command current.

According to an embodiment of the present disclosure, an apparatus and a method for controlling a motor driven power steering (MDPS) system of a vehicle can generate an additional compensation gain when a position controller inverses during autonomous driving in MDPS, thereby improving insufficient performance of simple PID control and control based on a model to which accurate dynamic compensation for friction or inertia is not applied, and raising performance of position control.

According to another embodiment of the present disclosure, an apparatus and a method for controlling a motor driven power steering (MDPS) system of a vehicle can improve the responsiveness while a steering angle position control portion basically uses a steering angle of a steering angle sensor for a driver's safety. Moreover, the apparatus and method is robust to noise of a command steering angle, thereby raising the stability of a controller and the responsiveness.

Effects of the present disclosure are not limited to the aforementioned effects, and may include various effects within a range evident to those skilled in the art from the following description.

DETAILED DESCRIPTION OF THE ILLUSTRATED EMBODIMENTS

Hereinafter, an apparatus and a method for controlling an MDPS system of a vehicle will be described in detail with reference to the accompanying drawings through various exemplary embodiments. The thicknesses of lines or the sizes of components in the drawings may have been exaggerated for the clarity of a description and for convenience' sake. Furthermore, terms to be described below have been defined by taking into consideration their functions in the present disclosure, and may be changed depending on a user or operator's intention or practice. Accordingly, such terms should be defined based on the overall contents of this specification.

An implementation described in this specification may be realized as a method or process, apparatus, software program, data stream or signal, for example. Although the present disclosure has been discussed only in the context of a single form of an implementation (e.g., discussed as only a method), a discussed characteristic may also be implemented in another form (e.g., apparatus or program). The apparatus may be implemented as proper hardware, software or firmware. The method may be implemented by an apparatus, such as a processor commonly referring to a processing device, including a computer, a microprocessor, an integrated circuit or a programmable logic device, for example. The processor also includes a communication device, such as a computer, a cell phone, a mobile phone/personal digital assistant ("PDA") and another device which facilitates the communication of information between end-users.

Figure 1:
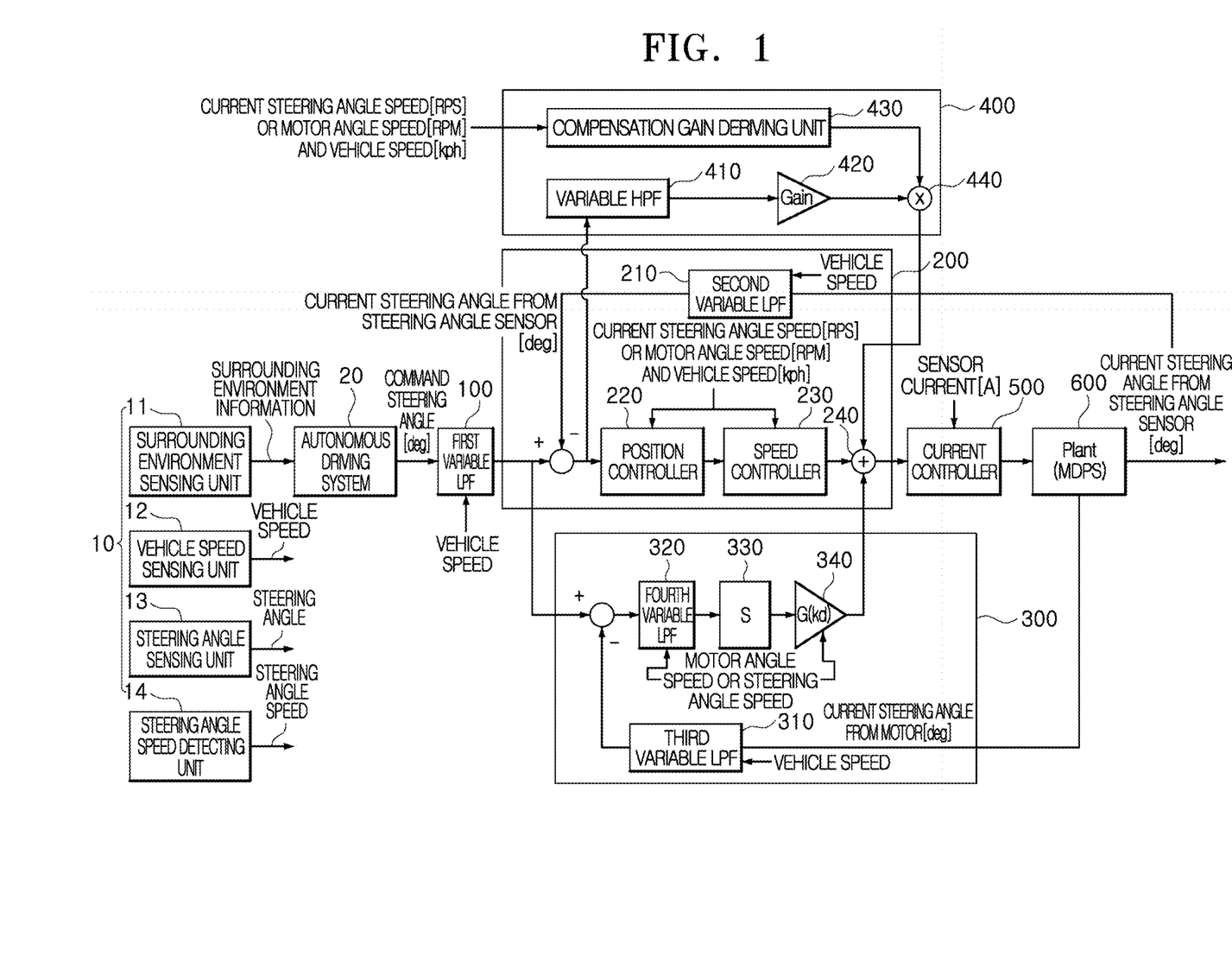
FIG. 1 is a block diagram illustrating a schematic configuration of an apparatus for controlling a motor driven power steering (MDPS) system of a vehicle according to an embodiment of the present disclosure.
Figure 2:
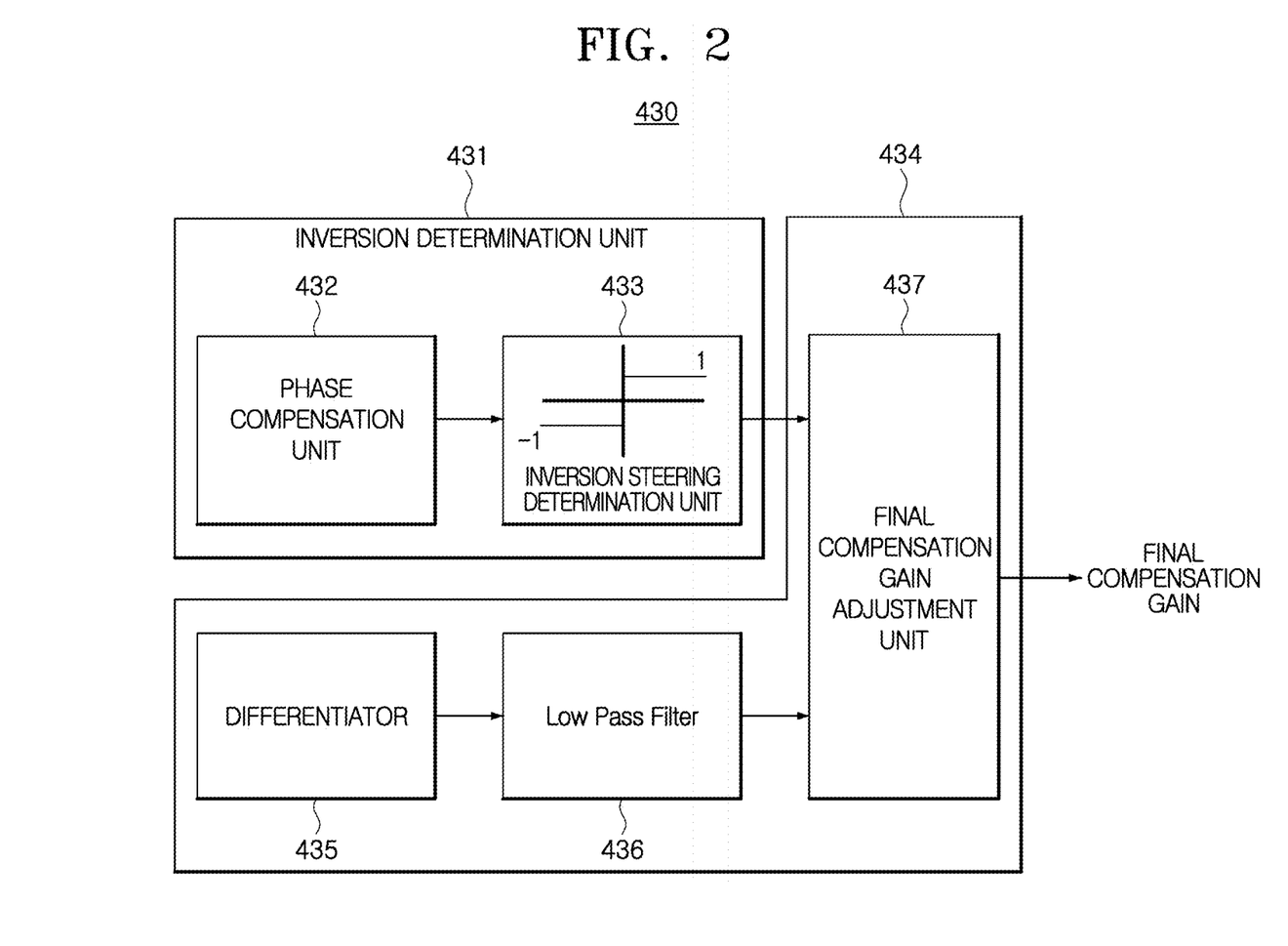
FIG. 2 is a block diagram illustrating a configuration of a compensation gain deriving unit illustrated in FIG. 1.
Figure 3:
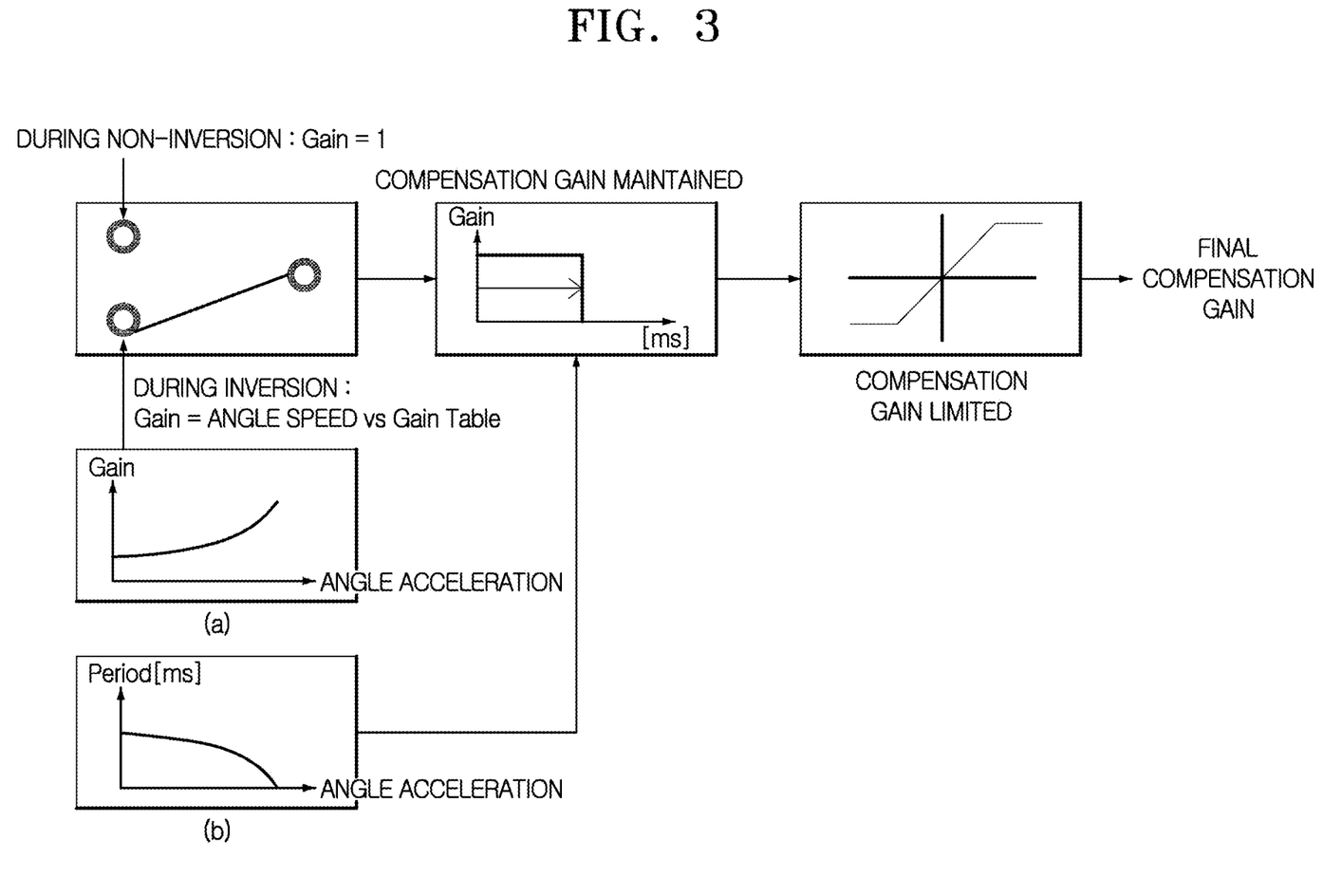
FIG. 3 is an exemplary diagram illustrating an operation of a final compensation gain adjustment unit illustrated in FIG. 2.

FIG. 1 is a block diagram illustrating a schematic configuration of an apparatus for controlling a motor driven power steering (MDPS) system of a vehicle according to an embodiment of the present disclosure, FIG. 2 is a block diagram illustrating a configuration of a compensation gain deriving unit 430 illustrated in FIG. 1, and FIG. 3 is an exemplary diagram illustrating an operation of a final compensation gain adjustment unit 437 illustrated in FIG. 2.

Referring to FIG. 1, the apparatus for controlling an MDPS system of a vehicle according to an embodiment of the present disclosure includes a sensing module 10, an autonomous driving system 20, a command steering angle control portion 100, a steering angle position control portion 200, a first responsiveness improving portion 300, a second responsiveness improving portion 400, and a current controller 500.

The sensing module 10 senses information necessary for autonomous driving and steering control. The sensing module 10 may include a surrounding environment sensing unit 11 that detects surrounding environment information required for an operation of the autonomous driving system 20, a vehicle speed sensing unit 12 that senses the speed of the vehicle, a steering angle sensing unit 13 that senses a steering angle of a steering wheel, and a steering angle speed detecting unit 14 that detects a steering angle speed of the steering wheel.

The steering angle speed detecting unit 14 may directly detect the steering angle speed from the steering wheel, but may also detect the steering angle speed by differentiating the steering angle sensed by the steering angle sensing unit 13.

Examples of the surrounding environment sensing unit 11 may include a lidar, a radar, an ultrasonic sensor, and an image sensor. Examples of the surrounding environment information may include road information, obstacle information, and weather information. The surrounding environment information is not limited to the above-described embodiment.

The autonomous driving system 20 may output a command steering angle for autonomous driving control of the vehicle on the basis of the surrounding environment information inputted from the surrounding environment sensing unit 11 in an autonomous driving mode.

Since a person skilled in the art can easily carry out that the autonomous driving system 20 performs the autonomous driving control of the vehicle on the basis of the surrounding environment information, a detailed description thereof is omitted herein.

The command steering angle control portion 100 may remove noise of a first command steering angle inputted from the autonomous driving system 20, and output the first command steering angle from which the noise is removed. At this time, the command steering angle control portion 100 may be implemented using a first variable low pass filter (LPF) 100.

In general, the autonomous driving is performed through steering angle position control. That is, when the autonomous driving system 20 applies the command steering angle to an MDPS 600, the MDPS 600 performs the position control accordingly. At this time, when the steering angle position control portion 200 that performs the position control receives the command steering angle, an LPF is applied to remove the noise. This is because, when the noise is mixed with the received command steering angle, the steering angle position control portion 200 was supposed to follow the command steering angle, but may rather diverge. Furthermore, the received command steering angle may be instantaneously significantly changed according to a communication period or the resolution of a steering angle sensor. In case of sudden steering during the autonomous driving, a large variation in the steering angle may be applied in the form of an impulse to the steering angle position control portion 200. Such high-frequency signals may rather degrade the performance of the steering angle position control portion 200, and pose a large threat to the stability. Thus, the cut-off frequency of the LPF is typically set according to a basic steering period.

However, since the application of the LPF also means that the responsiveness of the steering angle position control portion 200 is reduced, the application of the existing LPF having a fixed cut-off frequency leads to deterioration in the performance of the steering angle position control portion 200. In order to solve this problem, the first variable LPF 100 may be applied according to the present embodiment.

That is, the command steering angle control portion 100 may include the first variable LPF 100 which can adjust a cut-off frequency thereof through a process of removing the noise of the command steering angle (hereinafter referred to as a "first command steering angle") inputted from the autonomous driving system 20, and outputting a second command steering angle.

The first variable LPF 100 removes the noise of the first command steering angle by adjusting the cut-off frequency thereof according to a vehicle speed. That is, the first variable LPF 100 removes a noise component having a frequency equal to or higher than the cut-off frequency thereof by low-pass filtering the first command steering angle. At this time, the cut-off frequency may be adjusted according to the vehicle speed. When the vehicle speed increases, position control performance may become unstable due to noise caused by vibration of a road surface or eccentricity of a tire. To prevent this, as the vehicle speed increases, the first variable LPF 100 may decrease the cut-off frequency thereof, thereby raising stability of the steering angle position control portion 200 against the noise during high-speed driving. In addition, as the vehicle speed decreases, the first variable LPF 100 may increase the cut-off frequency thereof, thereby raising responsiveness to a high frequency, and improving response performance.

The command steering angle control portion 100 configured in the above-described manner may raise the stability of the steering angle position control portion 200 for the divergence of the steering angle position control portion 200 by noise or low resolution of the command steering angle and an impulse-based command which is generated in case of sudden steering, and maximize the responsiveness in a general situation, thereby improving the performance of a control device.

The steering angle position control portion 200 compensates for a first steering angle error (i.e. a first position control error) corresponding to a difference between the second command steering angle provided from the command steering angle control portion 100 and a first current steering angle provided from the steering angle sensor, and outputs a first command current. At this time, the steering angle position control portion 200 may low-pass filter the first current steering angle provided from the steering angle sensor, compensate for the first steering angle error corresponding to the difference between the second command steering angle and the low-pass filtered first current steering angle, and output the first command current.

The steering angle position control portion 200 may include a second variable LPF 210, a position controller 220 and a speed controller 230.

The second variable LPF 210 may remove noise of the first current steering angle provided from the steering angle sensor by adjusting a cut-off frequency thereof according to a vehicle speed. That is, the second variable LPF 210 may remove a noise component having a frequency equal to or higher than the cut-off frequency by low-pass filtering the first current steering angle. At this time, the cut-off frequency may be adjusted according to the vehicle speed.

When the vehicle speed increases, position control performance may become unstable due to noise caused by vibration of the road surface or eccentricity of the tire. To prevent this, as the vehicle speed increases, the second variable LPF 210 may decrease the cut-off frequency thereof, thereby raising stability of the steering angle position control portion 200 against the noise during high-speed driving. In addition, as the vehicle speed decreases, the second variable LPF 210 may increase the cut-off frequency thereof, thereby raising responsiveness to a high frequency, and improving response performance.

The position controller 220 may compensate for the first steering angle error corresponding to the difference between the second command steering angle and the low-pass filtered first current steering angle. At this time, the position controller 220 may be configured as a P controller, and output a command speed.

The speed controller 230 may compensate for a speed error corresponding to a difference between the command speed outputted from the position controller 220 and a current steering angle speed. At this time, the speed controller 230 may be configured as a PI controller, and output the first command current.

The position controller 220 and the speed controller 230 may vary gains on the basis of at least one of a vehicle speed, a motor angle speed and a steering angle speed.

Typically, the performance of the position controller 220 is absolutely affected even by a communication speed between an autonomous driving module and the MDPS 600. That is, when a transmission period of the command steering angle is, for example, 20 ms, vibration or shaking phenomenon occurs in the position controller 220 according to input/output periods of the controller. In particular, this phenomenon occurs frequently when the command steering angle speed is slow or the load is large, which is also caused by parameter tuning for raising the responsiveness of the position controller 220. In order to smoothly control the slow speed, decreasing an output fluctuation amount of the position controller 220 is more advantageous to stably increasing the control performance rather than increasing the output fluctuation amount of the position controller 220. Therefore, the gains of the position controller 220 and the speed controller 230 may vary using the vehicle speed as the influence of the load and the steering angle speed or the motor angle speed as a control speed. With this setting, the output of the position controller 220 may be optimized depending on a situation, which makes it possible to maximize the position control performance by reducing the gains of the position controller 220 and the speed controller 230 in the case of a position control situation where the load is small and slow, and raising the gains of the position controller 220 and the speed controller 230 in the case of a position control situation where the load is large and fast.

However, the steering angle position control portion 200 composed of the position controller 220 and the speed controller 230 has a limit in raising the responsiveness. Accordingly, the steering angle position control portion 200 may further include a first operation unit 240 that receives a required current from the first responsiveness improving portion 300 and outputs a second command current by adding the received required current to the first command current outputted from the speed controller 230. The required current may include a first compensation value compensating for a second steering angle error, which is a difference between the second command steering angle and a current steering angle provided from a motor (hereinafter referred to as a "second current steering angle"), generated by the first responsiveness improving portion 300, and a second compensation value generated by the second responsiveness improving portion 400 on the basis of a compensation gain according to inversion of the steering angle speed.

The first responsiveness improving portion 300 may calculate the first compensation value by compensating for the second steering angle error corresponding to the difference between the second command steering angle and the second current steering angle provided from the motor, and apply the first compensation value to the steering angle position control portion 200. At this time, the first responsiveness improving portion 300 may low-pass filter the second current steering angle provided from the motor, and apply, to the steering angle position control portion 200, the first compensation value for compensating for the second steering angle error corresponding to the difference between the second command steering angle and the low-pass filtered second current steering angle. This operation may serve to add an additional required current to the first command current, thereby raising the responsiveness of the steering angle position control portion 200.

Furthermore, depending on whether the current steering angle is sensed through the steering angle sensor or sensed through the rotation of the motor, the performance of the controller may be significantly changed. The first reason is the resolution of the sensor. The steering angle sensor may transfer a steering angle to the MDPS 600 through communication. Thus, a time delay may occur, and the resolution of the steering angle sensor may be several or several tens of times lower than that of an encoder sensor of the motor. The second reason is that the steering angle sensor is typically mounted on a steering wheel in the case of an R-MDPS which is driven through a belt. In this case, as a torsion bar is distorted, the steering angle of the steering angle sensor may become different from an actual rotation angle of a tire. That is, when only the steering wheel vibrates while the tire angle is fixed, such a vibration signal may be applied to the steering angle position control portion 200 as it is. In this case, the performance of the controller may be significantly degraded. Thus, the second current steering angle converted through the motor is normally used by the steering angle position control portion 200. However, when a belt slip occurs, a difference may occur between the actual steering angle of the vehicle in operation and the steering angle controlled by the MDPS 600. In this case, the vehicle may move in an unintended direction. When the belt slip occurs during autonomous driving, the position control may not be normally performed, and a serious problem in safety may occur. Thus, in a safety aspect, it is necessary to perform the position control on the basis of the steering angle sensor which is mechanically connected. However, the steering angle sensor has low resolution, the position does not mechanically and completely coincide, and is mounted on a torsion bar with a spring. Therefore, when the position control is performed during autonomous driving, unintended vibration or the like may occur. Typically, the torsion bar is a portion of the MDPS 600 which has the lowest stiffness. Since the steering angle sensor is mounted on the torsion bar, an angle different from an actual behavior of the vehicle may occur. For example, when a driver instantaneously hits the steering wheel by mistake, the autonomous driving system applies a sudden steering command, or vibration is applied to the MDPS 600 according to a road condition, the control performance may be degraded, and vibration may be generated. In order to solve such problems, a feedback signal of the steering angle position control portion 200 may use the steering angle of the steering angle sensor, and the first responsiveness improving portion 300 for improving responsiveness may use the steering angle converted through the motor, thereby simultaneously improving the responsiveness and the stability.

The first responsiveness improving portion 300 may include a third variable LPF 310, a fourth variable LPF 320, a differentiator 330, and a second operation unit 340.

The third variable LPF 310 may remove noise of the second current steering angle by low-pass filtering the second current steering angle provided from the motor. That is, the third variable LPF 310 may remove a noise component having a frequency equal to or higher than a cut-off frequency thereof by low-pass filtering the second current steering angle. At this time, the cut-off frequency may be adjusted according to a vehicle speed. When the vehicle speed increases, position control performance may become unstable due to noise caused by vibration of the road surface or eccentricity of the tire. To prevent this, as the vehicle speed increases, the third variable LPF 310 may decrease the cut-off frequency thereof, thereby raising stability of the steering angle position control portion 200 against the noise during high-speed driving. In addition, as the vehicle speed decreases, the third variable LPF 310 may increase the cut-off frequency thereof, thereby raising responsiveness to a high frequency, and improving response performance.

The fourth variable LPF 320 removes a noise component by low-pass filtering the second steering angle error corresponding to the difference between the second command steering angle and the second current steering angle low-pass filtered by the third variable LPF 10. At this time, the fourth variable LPF 320 may adjust the cut-off frequency thereof on the basis of at least one of the motor angle speed and the steering angle speed.

The differentiator 330 obtains a change amount by differentiating a value which is low-pass filtered by the fourth variable LPF 320.

The second operation unit 340 may multiply a value differentiated by the differentiator 330 by a gain, and apply the multiplication result value to the steering angle position control portion 200 as the first compensation value. At this time, the second operation unit 340 may multiply the value differentiated by the differentiator 330 by a gain according to the angle speed of the motor or the steering angle speed.

As described above, the first responsiveness improving portion 300 may low-pass filter the second steering angle error corresponding to the difference between the second command steering angle and the low-pass filtered second current steering angle, differentiate the low-pass filtered value, multiply the differentiation result value by a gain, and apply the multiplication result value to the first operation unit 240 of the steering angle position control portion 200. That is, the first responsiveness improving portion 300 may serve to replenish an insufficient input value of a previous stage of the first responsiveness improving portion 300 in real time by adding a current, corresponding to the difference between the second command steering angle and the second current steering angle, to the first command current. The first responsiveness improving portion 300 may be similar to a D controller of a general PID controller. However, when the D controller is applied just as the first responsiveness improving portion 300, applied noise may be significantly amplified to significantly degrade the performance of the controller. This is because the D controller has generally the same configuration as the differentiator 330. When noise is applied, the noise may be significantly amplified in case that the noise is differentiated. In order to prevent the amplification of the noise, the first responsiveness improving portion 300 applies an LPF or lag compensator applied to a previous stage of the D controller so that the differentiation is incompletely performed. In this case, unintended noise or the like may be filtered, and only a control change in a required band may be filtered. Simultaneously, the filtered signal may be applied to the steering angle position control portion 200 in real time, which makes it possible to raise the control responsiveness and to guarantee the stability.

As described above, the first responsiveness improving portion 300 may pass the fourth variable LPF 320 for the incomplete differentiation of the second steering angle error corresponding to the difference between the second command steering angle and the low-pass filtered second current steering angle, and then obtain the amount of change by differentiating the low-pass filtered value through the differentiator 330. Subsequently, the first responsiveness improving portion 300 may multiply the obtained value by the gain through the second operation unit 340, and then add the multiplication result value to the output, i.e., the first command current, of the speed controller 230.

As such, the first responsiveness improving portion 300 may maximize the control responsiveness by compensating for a current output terminal. This is a somewhat general method, but is inconvenient because it is necessary to accurately know a plant of the controller and tune plant parameters whenever a plant model is changed. In order to improve this, the present disclosure may include the second responsiveness improving portion 400 that simplifies an inverse plant model and converts the simplified model into a primary or secondary HPF form. The first variable LPF 100 may be applied to compensate for noise or disturbance according to the application of the HPF, to stabilize the performance.

The second responsiveness improving portion 400 may derive a compensation gain according to the inversion of the current steering angle speed or the motor angle speed, calculate the second compensation value on the basis of the first steering angle error, i.e., the first position control error, and the compensation gain, and apply the second compensation value to the steering angle position control portion 200. At this time, the second responsiveness improving portion 400 may high-pass filter the first steering angle error, i.e., the first position control error, multiply the filtered value by the gain, and apply the multiplication result value to the first operation unit 240 of the steering angle position control portion 200. In addition, the second responsiveness improving portion 400 may apply, to the first operation unit 240 of the steering angle position control portion 200, the second compensation value to which the compensation gain according to the inversion of the steering angle speed is additionally applied. This operation serves to add an additional required current to the first command current, thereby raising the responsiveness of the steering angle position control portion 200.

The second responsiveness improving portion 400 may include a variable HPF 410, a third operation unit 420, the compensation gain deriving unit 430, and a fourth operation unit 440.

The second responsiveness improving unit 400 takes the form of the variable HPF 410. This form may correspond to the configuration to which a D controller is added. For convenience and efficiency of controller design, the second responsiveness improving unit 400 may be reconfigured as a combination of the variable HPF 410 and the third operation unit 420.

The variable HPF 410 removes noise components by adjusting a cut-off frequency thereof and high-pass filtering the first steering angle error corresponding to the difference between the second command steering angle and the first current steering angle. In this case, the variable HPF 410 may adjust the cut-off frequency thereof according to the speed at which the position control operates. For example, at a high speed, the variable HPF 410 may increase the cut-off frequency thereof, and at a low speed, the variable HPF 410 may decrease the cut-off frequency thereof. This may not only optimize the range of a control band, but also block noise in unnecessary frequency bands other than the control band. Accordingly, the first steering angle error, i.e., the first position control error, is multiplied by an appropriate ratio or gain value, and is immediately converted into a current command, which makes it possible to implement a position controller that is more variable and has better performance while serving as an actual feed-forward compensator.

The third operation unit 420 may adjust the gain of the variable HPF 410 by using at least one of the vehicle speed and the current steering angle speed. That is, the third operation unit 420 may adjust the gain of the variable HPF 410 by multiplying a load curve gain based on the vehicle speed, the steering angle speed and a preset ratio. The ratio may be set to various values in consideration of various sudden steering environments under an actual autonomous driving condition. The load curve gain based on the vehicle speed, the steering angle speed and the ratio may be stored in a tuning map, in consideration of the control stability of the MDPS 600.

When noise or disturbance components generated from the actual steering angle are applied at it is to the position controller during position control, the control performance may deteriorate, which is greatly affected in relation to the vehicle speed. Therefore, the first variable LPF 100 based on the vehicle speed is applied to a previous stage of a feedback steering angle, and stabilizes the performance of the steering angle position control portion 200. However, there is a limit to compensation simply using the error amount of the position control in order to further improve the basic PID is limited.

For example, when the position control to the left or right is slowly performed while the vehicle stops, the position control is not performed properly during the inversion of the controller due to a large load. The PID is generally affected by the size and speed of the error amount of the position control. When there is a small position control error under an actual low speed condition, the PID controller compensates for a small value, and when errors are accumulated, an I controller tries to compensate for the errors with cumulative compensation, but the effect is not great even though a gain of the I controller is increased unconditionally. In addition, when the gain of the I controller is increased a lot, the control may not be performed smoothly, and may be performed pulsatively when following the command steering angle. That is, when the continuous errors are corrected, the degree to which the compensation gain becomes large and small according to the accumulated error increases, and thus there is a problem in that a side effect occurs.

To improve this operation, the second responsiveness improving portion 400 may include the compensation gain deriving unit 430 configured to derive the compensation gain according to the inversion of the steering angle speed or the motor angle speed.

The compensation gain deriving unit 430 may include an inversion determination unit 431 and a compensation gain adjustment unit 434 as illustrated in FIG. 2.

The inversion determination unit 431 detects a code of the speed at a speed control stage of an actual position controller. That is, since the code of the speed is changed during inversion, the inversion determination unit 431 may determine a control direction of the position control through the changed code of the speed. However, in consideration of mechanical characteristics, it is necessary to correct inversion timing more accurately than before an inversion encoding process. Accordingly, the inversion determination unit 431 may include a phase compensation unit 432 and an inversion steering determination unit 433.

The phase compensation unit 432 may correct the inversion timing by compensating for a phase of the steering angle speed or the motor angle speed. The phase compensation unit 432 may be implemented as a low pass filter (LPF) or a lag-compensator.

The inversion steering determination unit 433 may detect a code of the steering angle speed or the motor angle speed whose phase is compensated by the phase compensation unit 432. The inversion steering determination unit 433 may determine inverse steering on the basis of the detected code.

The compensation gain adjustment unit 434 may adjust the amount and period of the gain to be compensated during the inversion through a value of angle acceleration obtained by differentiating the current steering angle speed or the motor angle speed.

The compensation gain adjustment unit 434 may include a differentiator 435, an LPF 436, and a final compensation gain adjustment unit 437.

The differentiator 435 may differentiate the current steering angle speed or the motor angle speed, and output the angle acceleration.

The LPF 436 may remove noise by low-pass filtering the angle acceleration outputted from the differentiator 435.

The final compensation gain adjustment unit 437 may adjust the compensation gain to be compensated according to whether the steering angle speed or the motor angle speed is inversed. The final compensation gain adjustment unit 437 may adjust the compensation gain according to whether the speed is inversed, as illustrated in FIG. 3.

When the steering angle speed or the motor angle speed is non-inverted, the final compensation gain adjustment unit 437 may output "1" as the compensation gain.

When the steering angle speed or the motor angle speed is inverted, the final compensation gain adjustment unit 437 may adjust the amount and period of the compensation gain on the basis of the value of the angle acceleration obtained from the LPF 436. At this time, the final compensation gain adjustment unit 437 may include a compensation gain table in which information on the amount of the compensation gain based on the angle acceleration and the period of the compensation gain based on the angle acceleration are stored. The compensation gain based on an increase in the angle acceleration may increase in an exponential functional manner as illustrated in (a) of FIG. 3, and the period of the compensation gain based on an increase in the angle acceleration may decrease in an exponential functional manner as illustrated in (b) of FIG. 3.

The final compensation gain adjustment unit 437 may obtain the amount and holding period of the compensation gain based on the angle acceleration from the compensation gain table.

The compensation gain obtained by the final compensation gain adjustment unit 437 should not exceed a predetermined value or range. Accordingly, the final compensation gain adjustment unit 437 may limit the obtained compensation gain within the predetermined range, and derive the limited compensation gain as a final compensation gain.

The fourth operation unit 440 may perform an operation on the compensation gain derived from the compensation gain deriving unit 430 and the gain of the variable HPF 410 outputted from the third operation unit 420, and apply the obtained value to the first operation unit 240. At this time, the fourth operation unit 440 may multiply the compensation gain and the gain of the variable HPF 410, and apply the multiplication result value to the first operation unit 240. Consequently, the first operation unit 240 may output the first command current and the second command current obtained by adding the first compensation value, i.e., a first required current, outputted from the first responsiveness improving portion 300, and the second compensation value, i.e., a second required current, outputted from the second responsiveness improving portion 400.

The second responsiveness improving portion 400 configured as described above optimizes, through tuning, how much further a mechanism or a motor moves by inertia and how long the compensation gain is compensated for. Therefore, when the final inversion compensation gain is derived, the error amount of the position control is multiplied by the derived final inversion compensation gain, and the multiplication result value is compensated at a current control output terminal of the position controller, initial friction or inertia required for the inversion may be sufficiently compensated.

The current controller 500 compensates for a current error between the command current outputted from the steering angle position control portion 200 and a sensor current, and outputs a final command current. At this time, the current controller 500 may be a PI controller, and the sensor current may be a current that an MCU (not illustrated) acquires by sensing the motor.

When receiving the second command current from the steering angle position control portion 100 and receiving the sensor current from the MCU, the current controller 500 may compensate for an error corresponding to the difference between the second command current and the sensor current, output the final command current, and apply the final command current to the MDPS 600.

Hereinafter, a method for controlling an MDPS system in accordance with an embodiment of the present disclosure is described with reference to FIG. 4.

Figure 4:
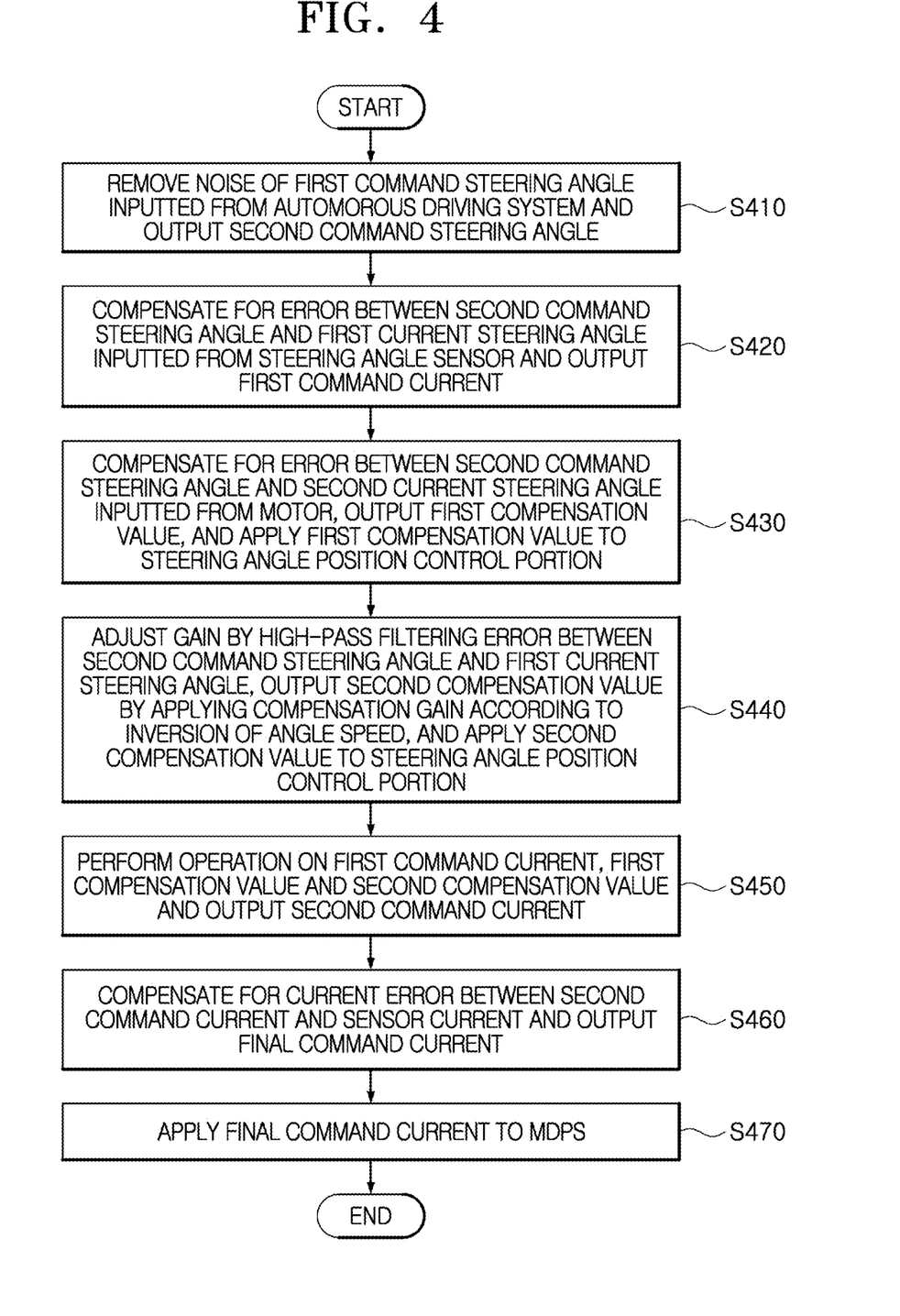
FIG. 4 is a flowchart for describing a method for controlling the MDPS system of a vehicle according to an embodiment of the present disclosure.

FIG. 4 is a flowchart for describing the method for controlling an MDPS system of a vehicle according to an embodiment of the present disclosure.

Referring to FIG. 4, the command steering angle control portion 100 removes noise of the first command steering angle inputted from the autonomous driving system 20, and outputs the second command steering angle, in step S410. At this time, the command steering angle control portion 100 may low-pass filter the first command steering angle, and remove a noise component having a frequency equal to or higher than the cut-off frequency. The cut-off frequency may be adjusted according to a vehicle speed.

The steering angle position control portion 200 compensates for the first steering angle error, which is the difference between the second command steering angle inputted from the command steering angle control portion 100 and the first current steering angle inputted from the steering angle sensor, and outputs the first command current, in step S420. Specifically, the second variable LPF 210 may low-pass filter the first current steering angle provided from the steering angle sensor, and remove a noise component having a frequency equal to or higher than the cut-off frequency thereof. At this time, the cut-off frequency may be adjusted according to the vehicle speed. The position controller 220 may compensate for the first steering angle error, which is the difference between the second command steering angle and the first current steering angle low-pass filtered by the second variable LPF 210, and output the command speed. The speed controller 230 may compensate for the speed error, which is the difference between the command speed outputted from the position controller 220 and the current steering angle speed, and output the first command current. At this time, the position controller 220 and the speed controller 230 may vary a gain on the basis of at least one of a vehicle speed, a motor angle speed and a steering angle speed.

When step S420 is performed, the first responsiveness improving portion 300 compensates for the second steering angle error, which is the difference between the second commanded steering angle and the second current steering angle provided from the motor, and applies the compensated value to the steering angle position control portion 200, in step S430.

Specifically, the third variable LPF 310 may low-pass filter the second current steering angle provided from the motor, remove the noise. That is, the third variable LPF 310 may low-pass filter the second current steering angle, and remove a noise component having a frequency equal to or higher than the cut-off frequency thereof. At this time, the cut-off frequency may be adjusted according to the vehicle speed. The fourth variable LPF 320 may low-pass filter the second steering angle error corresponding to the difference between the second command steering angle and the second current steering angle low-pass filtered by the third variable LPF 310, and remove a noise component. At this time, the fourth variable LPF 320 may adjust the cut-off frequency thereof on the basis of at least one of the motor angle speed and the steering angle speed. The differentiator 330 differentiates the value low-pass filtered by the fourth variable LPF 320, and obtains a change amount. The second operation unit 340 may multiply the value differentiated by the differentiator 330 by a gain, and apply the multiplication result value to the steering angle position control portion 200 as the first compensation value.

When step S420 is performed, the second responsiveness improving portion 400 high-pass filters the error between the second command steering angle and the first current steering angle, multiplies the filtered value by the gain, outputs the second compensation value by applying the compensation gain according to the inversion of the angle speed to the multiplication result value, and applies the second compensation value to the steering angle position control portion 200, in step S440.

Specifically, the variable HPF 410 may adjust the cut-off frequency thereof, high-pass filter the first steering angle error which is the difference between the second command steering angle and the first current steering angle, and remove a noise component. Subsequently, the third operation unit 420 may adjust the gain of the variable HPF 410 by using at least one of the vehicle speed and the current steering angle speed. At this time, the compensation gain deriving unit 430 may derive the compensation gain according to the inversion of the steering angle speed or the motor angle speed. Subsequently, the fourth operation unit 440 may multiply the compensation gain derived from the compensation gain deriving unit 430 by the gain of the variable HPF 410 outputted from the third operation unit 420, and apply the multiplication result value to the steering angle position control portion 200 as the second compensation value.

Meanwhile, although it is described in the present embodiment that step S440 is performed after step S430 is performed, steps S430 and S440 may be performed simultaneously.

When step S440 is performed, the steering angle position control portion 200 applies, to the first command current, the first compensation value applied from the first responsiveness improving portion 300 and the second compensation value applied from the second responsiveness improving portion 400, and outputs the second command current, in step S450. That is, the steering angle position control portion 200 may add the first compensation value and the second compensation value to the first command current, and output the second command current.

When step S450 is performed, the current controller 500 compensates for the current error between the second command current outputted from the steering angle position control portion 200 and the sensor current, outputs the final command current in step S460, and applies the final command current to the MDPS 600 in step S470. At this time, the current controller 500 may receive the second command current from the steering angle position control portion 200 and the sensor current from the MCU, the current controller 500 may compensate for the error corresponding to the difference between the second command current and the sensor current, output the final command current, and apply the outputted final command current to the MDPS 600.

As such, the apparatus and method for controlling an MDPS system of a vehicle in accordance with an embodiment of the present disclosure can generate an additional compensation gain when a position controller inverses during autonomous driving in MDPS, thereby improving insufficient performance of simple PID control and control based on a model to which accurate dynamic compensation for friction or inertia is not applied, and raising performance of position control.

Furthermore, the apparatus and method for controlling an MDPS system of a vehicle in accordance with another embodiment of the present disclosure can improve the responsiveness while a steering angle position control portion basically uses a steering angle of a steering angle sensor for a driver's safety. Moreover, the apparatus and method is robust to noise of a command steering angle, thereby raising the stability of a controller and improving the responsiveness.

The present disclosure has been described above with reference to the embodiments illustrated in the accompanying drawings, but the embodiments are merely for illustrative purposes. A person having ordinary knowledge in the art to which the present disclosure pertains will understand that various modifications and other equivalent embodiments are possible from the embodiments. Accordingly, the true technical scope of the present disclosure should be defined by the following claims.

What is claimed is:

1. An apparatus for controlling a motor driven power steering (MDPS) system of a vehicle, said apparatus comprising:
a command steering angle control portion configured to remove noise of a first command steering angle input from an autonomous driving system, and output a second command steering angle;
a steering angle position control portion configured to compensate for a first steering angle error corresponding to a difference between the second command steering angle and a first current steering angle provided from a steering angle sensor, and output a first command current;
a first responsiveness improving portion configured to compensate for a second steering angle error corresponding to a difference between the second command steering angle and a second current steering angle provided from a motor, calculate a first compensation value, and apply the first compensation value to the steering angle position control portion;
a second responsiveness improving portion configured to derive a compensation gain according to inversion of a steering angle speed or a motor angle speed, calculate a second compensation value based on the first steering angle error and the compensation gain, and apply the second compensation value to the steering angle position control portion,
wherein the steering angle position control portion applies the first compensation value and the second compensation value to the first command current, and outputs a second command current; and
a current controller configured to compensate for a current error between the second command current outputted from the steering angle position control portion and a sensor current, and output a final command current, and apply the final command current to the MDPS.

2. The apparatus of claim 1, wherein the command steering angle control portion comprises a first variable low pass filter (LPF) configured to adjust a cut-off frequency according to a vehicle speed, and remove the noise of the first command steering angle.

3. The apparatus of claim 2, wherein the steering angle position control portion comprises:
a second variable LPF configured to low-pass filter the first current steering angle;
a position controller configured to compensate for a first steering angle error corresponding to a difference between the second command steering angle and the low-pass filtered first current steering angle;
a speed controller configured to compensate for a speed error corresponding to a difference between a command speed output from the position controller and a current steering angle speed, and output the first command current; and
a first operation unit configured to add the first compensation value and the second compensation value to the first command current, and output the second command current.

4. The apparatus of claim 3, wherein the second variable LPF adjusts a cut-off frequency according to a vehicle speed.

5. The apparatus of claim 3, wherein at least one of the position controller and the speed controller vary a gain based on at least one of the vehicle speed, motor angle speed and steering angle speed.

6. The apparatus of claim 3, wherein the first responsiveness improving portion includes:
a third variable LPF configured to low-pass filter the second current steering angle;
a fourth variable LPF configured to low-pass filter the second steering angle error corresponding to a difference between the second command steering angle and the second current steering angle that is low-pass filtered by the third variable LPF;
a first differentiator configured to differentiate a value obtained by low-pass filtering the second steering angle error by the fourth variable LPF; and a second operation unit configured to multiply a differentiation result value by a gain, and apply a multiplication result value to the steering angle position control portion as the first compensation value.

7. The apparatus of claim 6, wherein the third variable LPF adjusts a cut-off frequency according to a vehicle speed.

8. The apparatus of claim 6, wherein the fourth variable LPF adjusts a cut-off frequency based on at least one of the motor angle speed and the steering angle speed.

9. The apparatus of claim 6, wherein the second responsiveness improving portion includes:
a variable high-pass filter (HPF) configured to adjust a cut-off frequency, and high-pass filter the first steering angle error;
a third operation unit configured to multiply a value, obtained by high-pass filtering the first steering angle error by the variable HPF, by a gain;
a compensation gain deriving unit configured to derive the compensation gain according to the inversion of the steering angle speed or the motor angle speed; and
a fourth operation unit configured to perform an operation on the compensation gain and a value outputted from the third operation unit, calculate the second compensation value, and apply the second compensation value to the steering angle position control portion.

10. The apparatus of claim 9, wherein the compensation gain deriving unit comprises:
an inversion determination unit configured to detect a code of the steering angle speed or the motor angle speed, and determine whether a steering direction is inverted based on the code; and
a compensation gain adjustment unit configured to adjust an amount and a period of a gain to be compensated during inversion through a value of angle acceleration obtained by differentiating the steering angle speed or the motor angle speed.

11. The apparatus of claim 10, wherein the inversion determination unit comprises:
a phase compensation unit configured to compensate for a phase of the steering angle speed or the motor angle speed; and
an inversion steering determination unit configured to detect the code of the steering angle speed or the motor angle speed whose phase is compensated, and determine whether the code of the steering angle speed or the motor angle speed is inverted based on the code.

12. The apparatus of claim 10, wherein the compensation gain adjustment unit comprises:
a second differentiator configured to differentiate the steering angle speed or the motor angle speed, and output the angle acceleration;
an LPF configured to low-pass filter the angle acceleration outputted from the second differentiator; and
a final compensation gain adjustment unit configured to adjust the amount and period of the compensation gain based on the low-pass filtered angle acceleration when a determination result of the inversion determination unit indicates inversion.

13. The apparatus of claim 12, wherein the final compensation gain adjustment unit obtains the amount and period of the compensation gain based on the low-pass filtered angle acceleration from a compensation gain table in which information on the amount and period of the compensation gain based on the angle acceleration is stored, and limits the obtained compensation gain within a predetermined range.

14. A method of controlling an MDPS system of a vehicle, said method comprising:

removing, by a command steering angle control portion, noise of a first command steering angle input from an autonomous driving system;
outputting, by the command steering angle control portion, a second command steering angle;
compensating, by a steering angle position control portion, for a first steering angle error corresponding to a difference between the second command steering angle and a first current steering angle provided from a steering angle sensor;
outputting, by the steering angle position control portion, a first command current;
compensating, by a first responsiveness improving portion, for a second steering angle error corresponding to a difference between the second command steering angle and a second current steering angle provided from a motor;
calculating, by the first responsiveness improving portion, a first compensation value;
applying, by the first responsiveness improving portion, the first compensation value to the steering angle position control portion;
deriving, by a second responsiveness improving portion, a compensation gain according to inversion of a steering angle speed or a motor angle speed;
calculating, by the second responsiveness improving portion, a second compensation value based on the first steering angle error and the compensation gain;
applying, by the second responsiveness improving portion, the second compensation value to the steering angle position control portion;
applying, by the steering angle position control portion, the first compensation value and the second compensation value to the first command current, and outputting a second command current;
compensating, by a current controller, for a current error between the second command current outputted from the steering angle position control portion and a sensor current, and outputting a final command current; and
applying, by the current controller, the final command current to the MDPS.

15. The method of claim 14, wherein during outputting of the second command steering angle,
the command steering angle control portion removes the noise of the first command steering angle by adjusting a cut-off frequency according to a vehicle speed and low-pass filtering the first command steering angle, and outputs the second command steering angle from which the noise is removed.

16. The method of claim 14, wherein outputting of the first command current comprises:
low-pass filtering, by a first variable low pass filter (LPF), the first current steering angle;
compensating, by a position controller, for a first steering angle error corresponding to a difference between the second command steering angle and the low-pass filtered first current steering angle;
compensating, by a speed controller, for a speed error corresponding to a difference between a command speed outputted from the position controller and a current steering angle speed; and
outputting the first command current.

17. The method of claim 16, wherein the applying of the first compensation value to the steering angle position control portion comprises:
low-pass filtering, by a second variable LPF, the second current steering angle;

low-pass filtering, by a third variable LPF, the second steering angle error corresponding to the difference between the second command steering angle and the second current steering angle that is low-pass filtered by the second variable LPF;

differentiating, by a differentiator, a value obtained by low-pass filtering the second steering angle error by the third variable LPF;

multiplying, by an operation unit, a differentiation result value by a gain; and applying a multiplication result value to the steering angle position control portion as the first compensation value.

18. The method of claim 14, wherein the applying of the second compensation value to the steering angle position control portion comprises:

adjusting, by a variable high-pass filter (HPF), a cut-off frequency;

high-pass filtering the first steering angle error;

multiplying, by a first operation unit, a value, which is obtained by high-pass filtering the first steering angle error, by a gain;

outputting a multiplication result value;

deriving, by a compensation gain deriving unit, the compensation gain according to the inversion of the steering angle speed or the motor angle speed;

performing, by a second operation unit, an operation on the compensation gain and a value outputted from the first operation unit;

calculating the second compensation value; and applying the second compensation value to the steering angle position control portion.

19. The method of claim 18, wherein the deriving of the compensation gain comprises:

detecting, by an inversion determination unit, a code of the steering angle speed or the motor angle speed;

determining whether the code of the steering angle speed or the motor angle speed is inverted based on the code; and adjusting, by a compensation gain adjustment unit, an amount and a period of a gain to be compensated during inversion through a value of angle acceleration obtained by differentiating the steering angle speed or the motor angle speed.

* * * * *